(12) United States Patent
Sakakibara et al.

(10) Patent No.: US 9,460,607 B2
(45) Date of Patent: Oct. 4, 2016

(54) SYSTEM FOR DETECTING TENSILE FORCE OF GUY ROPE IN PNEUMATIC FENDER AND PNEUMATIC FENDER

(71) Applicant: The Yokohama Rubber Co., LTD., Minato-ku, Tokyo (JP)

(72) Inventors: Shigeki Sakakibara, Hiratsuka (JP); Michito Kaneko, Hiratsuka (JP); Shu Yamada, Hiratsuka (JP); Minami Izumi, Hiratsuka (JP); Koji Nakatani, Hiratsuka (JP)

(73) Assignee: The Yokohama Rubber Co., LTD. (JP)

( * ) Notice: Subject to any disclaimer, the term of this patent is extended or adjusted under 35 U.S.C. 154(b) by 0 days.

(21) Appl. No.: 14/653,790

(22) PCT Filed: Dec. 16, 2013

(86) PCT No.: PCT/JP2013/083593
§ 371 (c)(1),
(2) Date: Jun. 18, 2015

(87) PCT Pub. No.: WO2014/098021
PCT Pub. Date: Jun. 26, 2014

(65) Prior Publication Data
US 2015/0325099 A1 Nov. 12, 2015

(30) Foreign Application Priority Data

Dec. 20, 2012 (JP) ................. 2012-277992

(51) Int. Cl.
G08B 21/00 (2006.01)
G08B 21/18 (2006.01)
(Continued)

(52) U.S. Cl.
CPC ............. *G08B 21/182* (2013.01); *B63B 59/02* (2013.01); *G01L 5/101* (2013.01); *B63B 2059/025* (2013.01); *E02B 3/26* (2013.01)

(58) Field of Classification Search
CPC ................ G08B 21/182; B63B 59/02; B63B 2059/025; G01L 5/101; E02B 3/26
See application file for complete search history.

(56) References Cited

U.S. PATENT DOCUMENTS 3,871,323 A * 3/1975 Roseman ................ B63B 35/70
114/251
5,207,171 A * 5/1993 Westwood, III ........ B63B 21/08
114/218

(Continued)

FOREIGN PATENT DOCUMENTS

JP   H07-017464   1/1995
JP   H07-232693   9/1995

(Continued)

OTHER PUBLICATIONS

International Search Report for International Application No. PCT/JP2013/083593 dated Mar. 11, 2014, 4 pages, Japan.

*Primary Examiner* — Erin File
(74) *Attorney, Agent, or Firm* — Thorpe North & Western

(57) ABSTRACT

The present technology provides a system for detecting the tensile force of a guy rope in a pneumatic fender capable of preventing the breakage of the guy rope, and a pneumatic fender. Tensile force data detected by a tensile force sensor detecting the tensile force of a guy rope is transmitted by a wireless transmitter, and is inputted to a computation device through a receiver. An alerting device issues an alert when the tensile data is at least equivalent to reference data previously inputted to the computation device.

9 Claims, 3 Drawing Sheets

(51) Int. Cl.
   *G01L 5/10*   (2006.01)
   *B63B 59/02*   (2006.01)
   *E02B 3/26*   (2006.01)

(56) References Cited

U.S. PATENT DOCUMENTS

| | | | | |
|---|---|---|---|---|
| 8,087,371 | B1* | 1/2012 | Sadegh | B63B 59/02 |
| | | | | 114/119 |
| 2009/0107384 | A1* | 4/2009 | Stephenson, Jr. | E02B 3/26 |
| | | | | 114/219 |
| 2010/0070118 | A1 | 3/2010 | Yamada | |
| 2011/0158760 | A1* | 6/2011 | Dahl | D07B 1/18 |
| | | | | 410/96 |
| 2015/0203179 | A1* | 7/2015 | Yu | B63B 59/02 |
| | | | | 114/219 |

FOREIGN PATENT DOCUMENTS

| | | |
|---|---|---|
| JP | 2004-219605 | 8/2004 |
| JP | 2007-168749 | 7/2007 |
| WO | WO 2008/053887 | 5/2008 |

* cited by examiner

SYSTEM FOR DETECTING TENSILE FORCE OF GUY ROPE IN PNEUMATIC FENDER AND PNEUMATIC FENDER

TECHNICAL FIELD

The present technology relates to a system for detecting tensile force of a guy rope in a pneumatic fender and a pneumatic fender; in particular, a system for detecting tensile force of a guy rope in a pneumatic fender capable of preventing the breakage of the guy rope and a pneumatic fender.

BACKGROUND

The pneumatic fender is installed in a quay in a port or on the side of a ship by being anchored with a guy rope (for example, refer to Japanese Unexamined Patent Application Publication No. 2007-168749A). For example, when performing an operation of passing crude oil or the like between two ships at sea, a pneumatic fender is installed between these ships. The tensile force generated in the guy rope varies during such an operation or when installing or removing the pneumatic fender. A guy rope able to sufficiently withstand the tensile force which it is assumed will be generated is selected as the guy rope to be used; however, breakages may occur due to the generation of excessive tensile forces at least equivalent to the assumed tensile force. When the guy rope breaks, extensive damage is caused, forcing interruptions to the operation or the like.

However, in the related art, there was no means for determining the tensile force generated in the guy rope with high accuracy. Therefore, it was necessary to take countermeasures to prevent breakage of the guy rope such as using an excessively thick guy rope set to a high safety factor.

SUMMARY

The present technology provides a system for detecting tensile force of a guy rope in a pneumatic fender capable of preventing breakage of the guy rope and a pneumatic fender.

A system for detecting tensile force of a guy rope in a pneumatic fender of the present technology is provided with a tensile force sensor detecting tensile force of a guy rope anchoring a pneumatic fender, a wireless transmitter transmitting tensile force data detected by the tensile force sensor, a computation device to which tensile force data transmitted by the wireless transmitter is inputted, and an alerting device, in which the alerting device issues an alert when the inputted tensile force data is at least equivalent to reference data previously inputted to the computation device.

In addition, a pneumatic fender of the present technology is provided with a fender main body, a bracket member interposed between the fender main body and a guy rope, a tensile force sensor attached to the bracket member to detect tensile force in the guy rope, and a wireless transmitter attached to the fender main body, in which tensile force data detected by the tensile force sensor is transmitted to a computation device which determines whether or not an excessive tensile force is generated based on the tensile force data.

According to the present technology, it is possible to sequentially determine tensile force generated in a guy rope using a tensile force sensor detecting the tensile force in the guy rope. An alerting device issues an alert when tensile force data detected by the tensile force sensor is transmitted and inputted to a computation device by a wireless transmitter and is at least equivalent to reference data previously inputted to the computation device, thus it is possible to issue an alert before the guy rope breaks as long as the reference data is appropriately set. When an alert is issued, it is possible to prevent breakage of the guy rope by carrying out a process which reduces the tensile force generated in the guy rope.

DETAILED DESCRIPTION

Below, description will be given of the system for detecting tensile force of a guy rope in a pneumatic fender and the pneumatic fender of the present technology based on the embodiment illustrated in the diagram.

Figure 1:
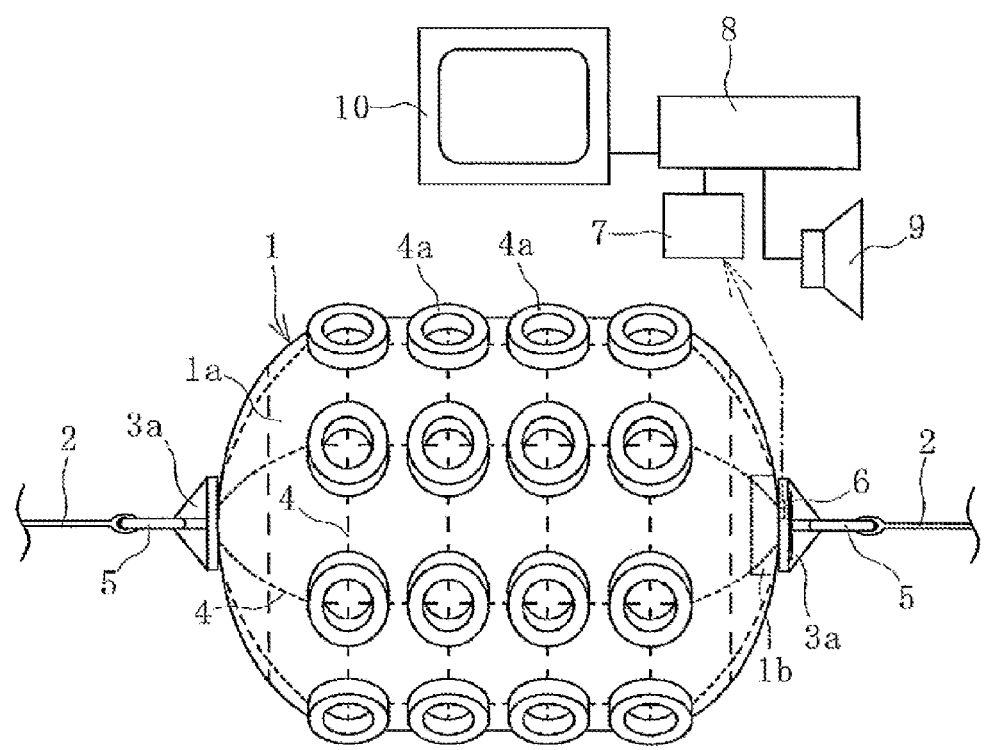
FIG. 1 is an explanatory diagram illustrating a pneumatic fender and a system for detecting tensile force of a guy rope in a pneumatic fender of the present technology.

A pneumatic fender 1 (below, fender 1) of the present technology as illustrated in FIG. 1 is provided with a fender main body 1a, bracket members (towing rings 3a) interposed between the fender main body 1a and guy ropes 2, tensile force sensors 5 detecting tensile force generated in the guy ropes 2, and a wireless transmitter 6.

The fender main body 1a has rubber as the main material thereof and has bowl shaped mirror sections on both sides of a cylindrical section, and a fitting 1b is provided on at least one mirror section. A large number of protective members 4a connected with chains 4 are arranged on an outer peripheral surface of the fender main body 1a. The provision of the protective members 4a is optional; however, for example, tires or the like may be used. End sections of these chains 4 are connected with the towing rings 3a arranged on the mirror sections of the fender main body 1a.

The tensile force sensors 5 are attached to bracket members interposed between the fender main body 1a and the guy ropes 2. In this embodiment, the tensile force sensors 5 are interposed between the guy ropes 2 and the towing rings 3a. The installation locations of the tensile force sensors 5 are not limited to these locations and installation is also possible on the towing rings 3a. It is possible to illustrate strain gauges as the tensile force sensors 5. According to the tensile force sensors 5, it is possible to detect tensile forces generated in the guy ropes 2 stably and with high accuracy.

The wireless transmitter 6 is attached to an inner section of the fender main body 1a, for example, attached to the inner section of the fitting 1b or in the vicinity of the fitting 1b. Tensile force data T detected by the tensile force sensor 5 is transmitted and inputted to a computation device 8 by the wireless transmitter 6. The computation device 8 determines whether or not an excessive tensile force is generated based on the inputted tensile force data T. For this reason, reference data C which is a reference for determining whether or not an excessive tensile force is generated in the guy rope 2 is previously inputted to the computation device 8.

The system for detecting tensile force of a guy rope of the present technology is configured of the tensile force sensor 5, the wireless transmitter 6, the computation device 8, and an alerting device 9. In the system, the alerting device 9 issues an alert when the tensile force data T inputted to the computation device 8 is at least equivalent to the previously inputted reference data C.

For example, a personal computer is used as the computation device 8. An alarm, an alert light, an alert wireless broadcast, or the like, or a combination of these are used as the alerting device 9.

In this embodiment, a monitor 10 connected with the computation device 8 is further provided. It is possible to optionally provide the monitor 10.

The tensile force sensor 5 sequentially detects the tensile force generated in the guy rope 2. The tensile force data T detected by the tensile force sensor 5 is sequentially wirelessly transmitted by the wireless transmitter 6. The transmitted tensile force data T is inputted to the computation device 8 through a receiver 7.

Figure 2:
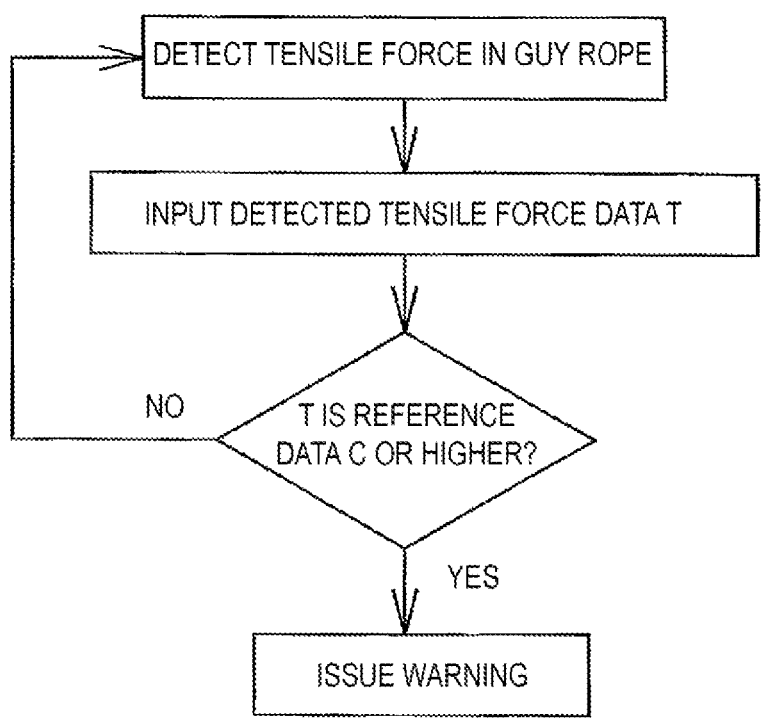
FIG. 2 is a flow chart illustrating a procedure for determining whether or not an excessive tensile force is generated.

The computation device 8 sequentially determines whether or not an excessive tensile force is generated by comparing the inputted tensile force data T and the reference data C. The procedure for performing this determination is as illustrated in FIG. 2.

As the reference data C, the value of the tensile force which the guy rope 2 is able to withstand in practice is set as a threshold. In a case where the detected tensile force data T (the value of the tensile force) reaches or exceeds the value of the tensile force set as the reference data C, it is determined that an excessive tensile force is generated. When it is determined that an excessive tensile force is generated, the alerting device 9 immediately issues an alert. Since there is a potential for breakage in the guy rope 2 when an alert is issued by the alerting device 9, a process which reduces the tensile force generated in the guy rope 2 is carried out. According to this process, it is possible to prevent breakages in the guy rope 2.

Since it is possible to issue an alert before the guy rope 2 breaks as long as the reference data C is appropriately set in this manner, it is possible to reliably prevent breakages in the guy rope 2. In addition, since it is possible to prevent breakages based on the tensile force generated in the guy rope 2, there is no need to use an over-engineered (for example, excessively thick) guy rope set to an excessively high safety factor in order to prevent breakages in the guy rope 2.

The reference data C is, for example, set based on the specifications of the guy rope 2. These specifications are the thickness, material, structure, and the like of the guy rope 2, and the reference data C is set based on at least one out of these specifications. For example, the thicker the guy rope 2, the greater the value of the tensile force set as the reference data C. Alternatively, the reference data C is set based on the usage frequency of the guy rope 2. That is, the greater the usage frequency of the guy rope 2, the greater the value of the tensile force set as the reference data C. In such a case, the usage frequency of each of the guy ropes 2 is recorded in the computation device 8. Alternatively, it is also possible to set the reference data C based on the thickness and the usage frequency of the guy rope 2. By setting the reference data C in this manner, it is possible to more reliably prevent breakages in the guy rope 2.

The monitor 10 may, for example, sequentially display the tensile force data T and the reference data C inputted to the computation device 8. Due to this, it is possible to immediately grasp whether or not an excessive tensile force is generated by looking at the display on the monitor 10.

Figure 3:
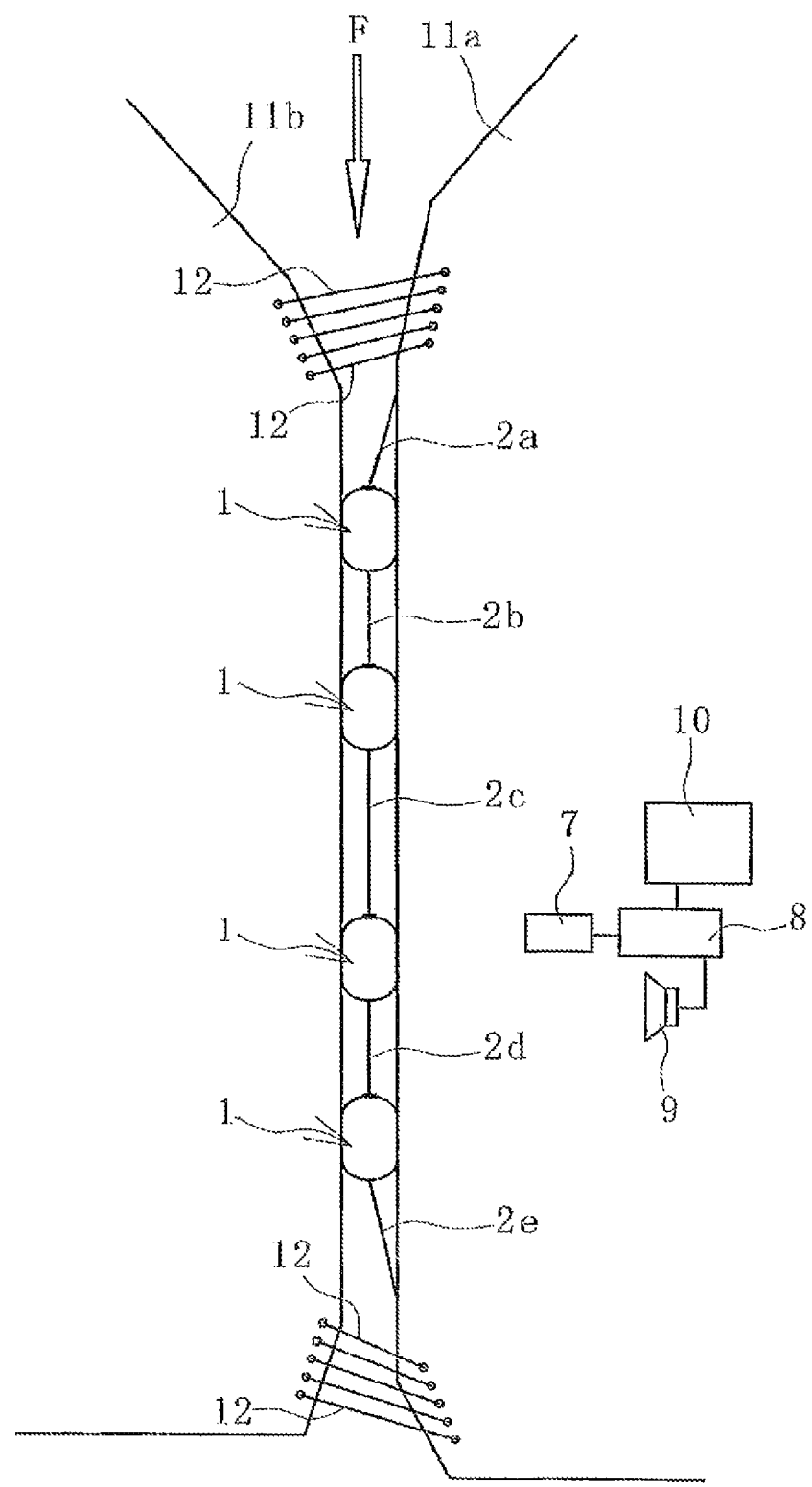
FIG. 3 is an explanatory diagram illustrating an arrangement of the pneumatic fender of the present technology.

In a case where an operation of transferring crude oil or the like between ships 11a and 11b is performed, as illustrated in FIG. 3, a plurality of the fenders 1 are connected using guy ropes 2a, 2b, 2c, 2d, and 2e and arranged on the ship's sides. The receiver 7, the computation device 8, the alerting device 9, and the monitor 10 are, for example, installed in a control room in the ship 11a (11b).

When the computation device 8 determines that an excessive tensile force is generated in any of the guy ropes 2a to 2e and an alert is issued by the alerting device 9, for example, the interval between the two ships is narrowed by immediately tightening a ship mooring rope 12 which keeps the interval between the ships 11a and 11b. Due to this, the tensile force generated in the guy ropes 2a to 2e is reduced. Alternatively, the operation between the ships 11a and 11b is stopped. Due to this process, breakages are prevented in the guy ropes 2a to 2e.

In addition, in the case of this operation, an excessive tensile force is easily generated in the guy rope 2a which is on the side (leading end side of the ships 11a and 11b) in a direction F in which the waves are moving. Therefore, for the guy rope 2a which is closest to the side in the direction F in which the waves are moving, the thickest out of all of the guy ropes 2a, 2b, 2c, 2d, and 2e, or the guy rope with the lowest usage frequency may be used.

What is claimed is:

1. A system, the system comprising:
a tensile force sensor detecting tensile force of a guy rope anchoring a pneumatic fender;
a wireless transmitter transmitting tensile force data detected by the tensile force sensor;
a computation device receiving the detected tensile force data; and
an alerting device issuing an alert when the detected tensile force data is greater than or equal to reference data.

2. The system of claim 1, wherein the pneumatic fender comprises a main body, the tensile force sensor is a strain gauge attached to a bracket member, wherein the bracket member is interposed between the guy rope and the pneumatic fender main body.

3. The system of claim 1, wherein the reference data is determined based on specifications of the guy rope.

4. The system of claim 1, wherein the reference data is determined based on a usage frequency of the guy rope.

5. The system of claim 2, wherein the reference data is determined based on specifications of the guy rope.

6. The system of claim 5, wherein the reference data is determined based on a usage frequency of the guy rope.

7. The system of claim 2, wherein the reference data is determined based on a usage frequency of the guy rope.

8. The system of claim 3, wherein the reference data is determined based on a usage frequency of the guy rope.

9. A pneumatic fender comprising:
a fender main body;
a bracket member interposed between the fender main body and a guy rope;
a tensile force sensor attached to the bracket member to detect tensile force in the guy rope; and
a wireless transmitter attached to the fender main body, wherein the wireless transmitter transmits the detected tensile force data to a computation device.

* * * * *